United States Patent Office 3,371,550
Patented Mar. 5, 1968

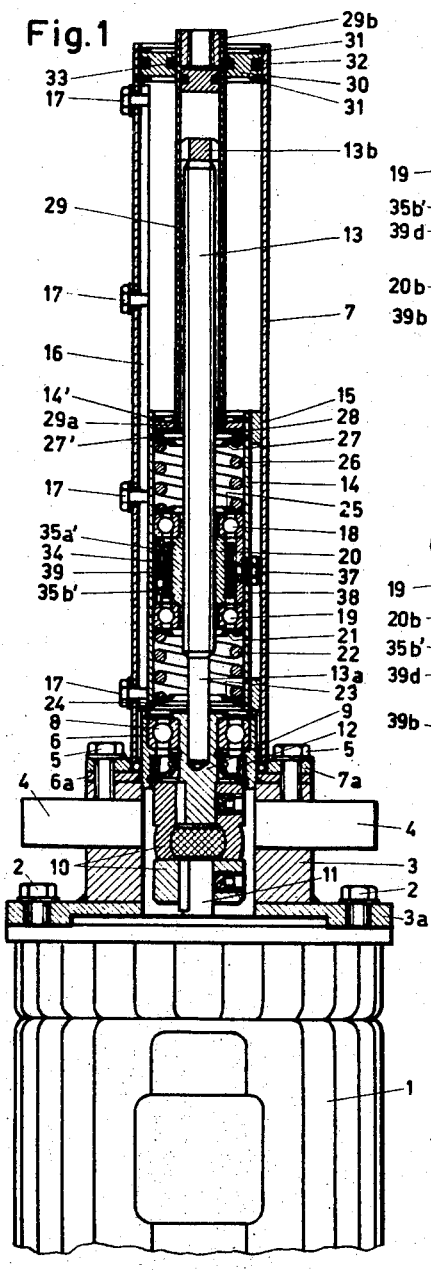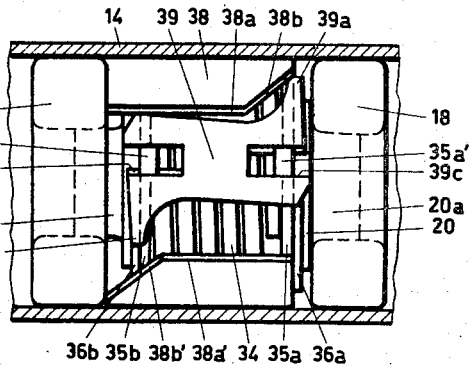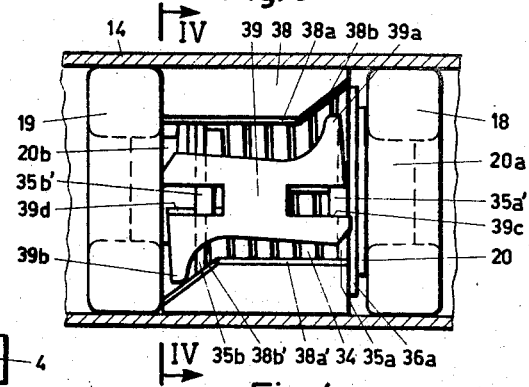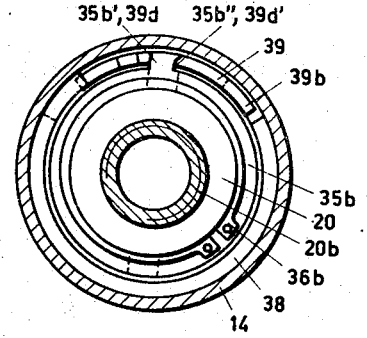

3,371,550
TRANSMISSIONS FOR CONVERTING ROTARY
INTO LINEAR MOTION
Richard Haller, Brauerstrasse 51, Zurich, Switzerland
Filed Dec. 17, 1965, Ser. No. 514,510
Claims priority, application Switzerland, Dec. 18, 1964,
16,391/64
8 Claims. (Cl. 74—424.8)

ABSTRACT OF THE DISCLOSURE

A drive incorporating an overrunning device for converting rotary motion into linear motion, wherein power is transmitted between a nut screwing along a threaded spindle or lead screw driven by the driving member and a non-rotatable axially displaceable tubular piston coaxially embracing the nut and connected with the driven member, through the medium of a locking spring, the ends of which, by means of a longitudinally slotted bush fixed in the tubular piston, are so influenced that for the transmission of power the locking spring bears tightly upon the nut and prevents it from rotating with the lead screw, whereas in the overrunning position the spring is relaxed to release the nut, so that it can rotate with the lead screw. The nut is held in a mid position in the tubular piston between two compression springs, and, when the piston is locked, is axially displaced in the latter. The locking ring, which is mounted upon the not on the lead screw, is located between two entraining rings loosely embracing the nut, these entraining rings being each held between two expanding split spreader rings, each inserted in an annular grove in the nut. Each entraining ring as at least one projection, which engages in a recess in the adjacent end face of the locking spring, and also has a projection extending radially outwards, upon which latter projection a control member located in the longitudinal slot of the bush and embracing the nut together with the locking spring, is provided with recesses for slidably guiding the said projections in an axial direction.

---

This invention relates to a transmission for converting the rotary motion of a drive means into an axial linear motion of a driven member. Transmissions of this kind which also incorporate an overrunning device are already known to the art. The rotary drive is transmitted by a travelling nut on a lead screw driven by the drive means through a coiled tightenable locking spring to a non-rotatable axially movable tubular member surrounding the nut and connected to the axially driven member, the ends of the spring which grips the nut for the transmission of the drive being bent in the radial direction for engagement of a slot in the tubular member, whereas the nut is urged by two opposed acting compression springs into a centre position inside the tubular member and is axially displaced from said centre position when further axial movement of the tubular member is impeded, until the end of the locking spring rides out of the slot and is thereby released to relinquish its grip on the nut and thus to interrupt the further transmission of drive. It has also been proposed in a transmission of the specified kind to transmit the reactive thrust which the slotted member, when the nut rotates, applies to the locking spring through the edge which retains one end of the spring, by mechanical means in the opposite direction to the other end of the spring which does not bear against the slot edge and thereby further to tighten the frictional grip of the spring.

Generally speaking such transmissions operate successfully in actual practice, even in cases in which the forces that are transmitted are fairly large. However, it has been found that considerable difficulties arise in connection with the provision of the required off-angled ends on the locking spring with a sufficient degree of precision. Apart from these difficulties involved in production any imprecision in such a transmission, especially when the transmitted forces are high, may sometimes cause the transmission to release and to revert to overrunning position when it ought to have remained in working position for the continued transmission of drive.

Another major drawback of known types of transmission of the specified kind is that the locking spring is not merely loaded in a direction causing the spring to be tightened but also in the axial direction and this latter effect causes most undesirable wear on all the cooperating parts of the transmission, apart from the fact that the proper functioning of the locking spring may be impaired and faulty operation of the transmission result.

It is the object of the present invention to eliminate these drawbacks.

The invention therefore relates to a transmission, incorporating an overrunning device, for converting the rotary motion of a drive means into an axial linear motion of a driven member, wherein the drive is transmitted by a travelling nut on a lead screw driven by the drive means to a non-rotatable axially movable tubular piston member surrounding the nut and connected to the driven member, through the intermediary of a coiled tightenable locking spring of which the ends are controlled by a longitudinally slotted bush fast in the tubular piston in such a way that for the transmission of drive the locking spring tightly embraces and grips the nut preventing the same from participating in lead screw rotation, whereas in overrunning position the spring is unwound to release the nut, permitting the same to participate in lead screw rotation, the nut being urged by two opposed acting compression springs into a central position inside the tubular piston member but axially displaced inside the piston member when the latter is impeded from axially moving. In such a transmission, according to the invention, the coiled locking spring which embraces the nut on the lead screw is held between two entraining rings loosely embracing the nut, said entraining rings being located between two expanding split rings clipped into an annular groove in the nut and each ring being formed with at least one projection for engagement of a recess cut into one axial end of the locking spring as well as with a radial outward projection for axial slidable engagement of a control element which is provided with suitable guide means for the reception of said projections, and which is confined between the edges of an axial slot in a non-rotatable bush which is fast inside the piston connected to the driven member, and which surrounds the nut as well as the locking spring.

Conveniently the projection on each entraining ring that engages the recess cut into one end of the locking spring and the radial outward projection that engages the guideway in the control element are both combined in a single projection.

The parts comprised in this transmission, particularly the locking spring and the entraining rings, are easy to make and present no manufacturing difficulties. As will be understood from the particular description that follows the locking spring is not subjected to loads acting in the axial direction. The transmission therefore functions reliably even under maximum loads.

Four embodiments of the invention are now described with reference to the attached drawings.

FIG. 1 is an axial section of a transmission, incorporating an overrunning device, for the conversion of the rotary motion of a driving motor into an axial motion of a driven member;

FIG. 2 is the coupling assembly of the transmission, partly in section, directly before reaching overrunning position;

Figure 5:
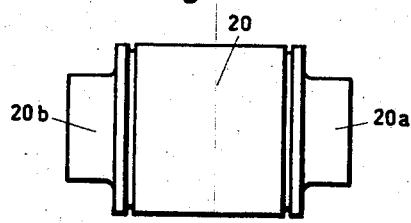
Figure 6:
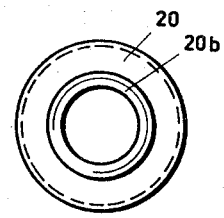
Figure 7:
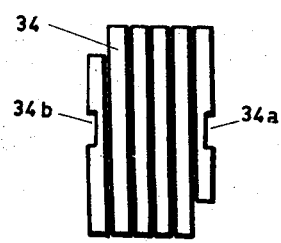
Figure 8:
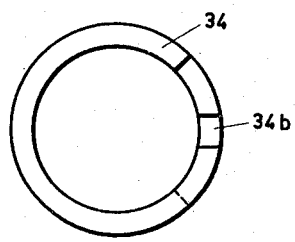
Figure 9:
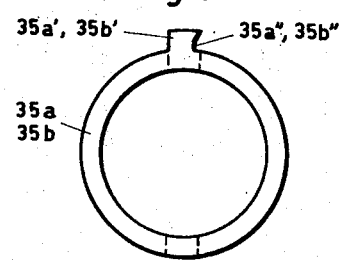
Figure 10:
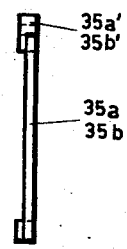
Figure 11:
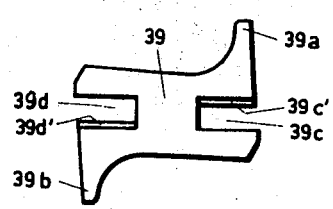

FIG. 3 is the coupling member shown in FIG. 2, likewise partly in section, after reversal of the hand of rotation of the driving motor directly before the transmission of the drive is about to begin, FIG. 4 is a section taken on the line A—A in FIG. 3, FIG. 5 is a side view of the nut working on the lead screw of the transmission, FIG. 6 is an end-on view of the nut shown in FIG. 5, FIG. 7 is a side view of the coiled locking spring of the coupling assembly illustrated in FIGS. 2 to 4, FIG. 8 is an end-on view of the locking spring according to FIG. 7;

FIG. 9 is a view of one entraining ring of the coupling assembly according to FIGS. 2 to 4, FIG. 10 is a side view of the entraining ring according to FIG. 9;

FIG. 11 is a view of the control element of the coupling assembly according to FIGS. 2 to 4, and FIG. 12 is a side view of the control element according to FIG. 11.

Figure 13:
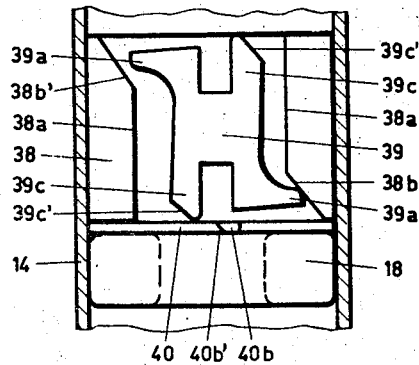
Figure 14:
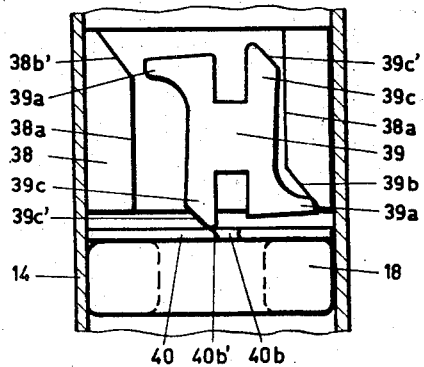

FIGURES 13, 14 and 15a show a part of another embodiment of a transmission with a free-wheel arrangement, in accordance with the invention, for converting the rotational movement of a motor into an axial movement, the transmission being shown in three positions, partly in section.

Figure 16:
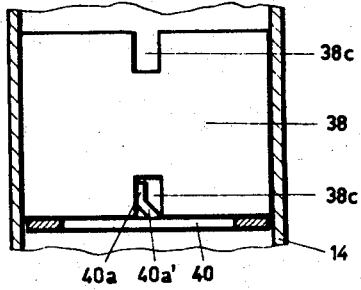
Figure 15:
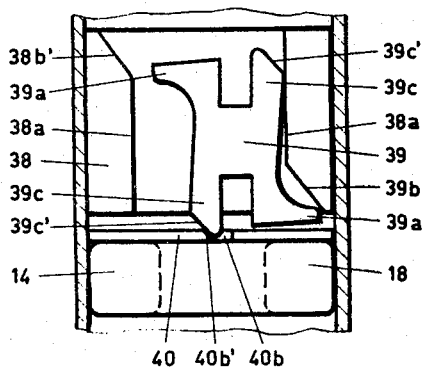

FIGURE 16 shows the part of the transmission shown in FIGURES 13-15 from the opposite direction partly in section.

Figure 17:
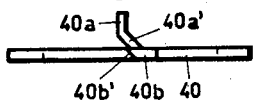

FIGURE 17 shows a side view of an annular disc used in this transmission.

Figure 18:
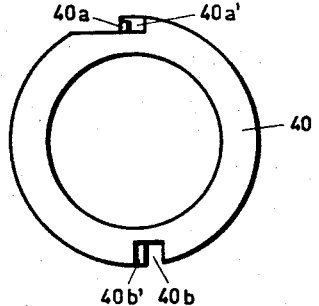

FIGURE 18 is a plan view of a disc shown in FIGURE 17.

Figure 19:
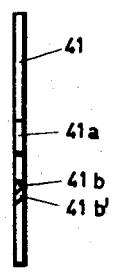

FIGURE 19 is a side view of one of the discs used in the embodiments of the invention shown in FIGURES 13-18.

Figure 20:
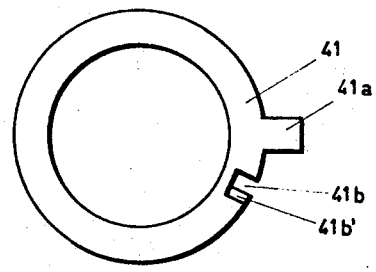

FIGURE 20 is a plan view of a disc shown in FIGURE 19.

Figure 21:
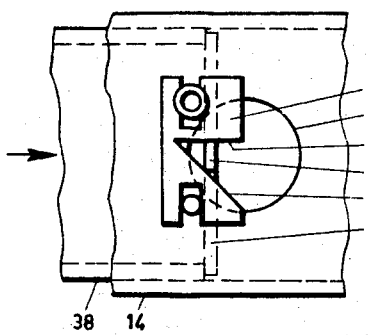

FIGURE 21 is a plan view of another part of this embodiment of the transmission in accordance with the invention.

Figure 22:
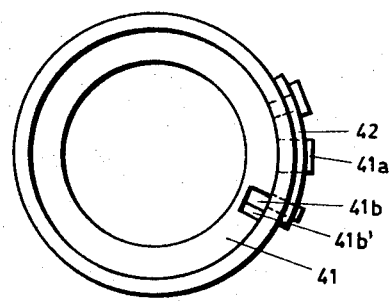

FIGURE 22 is a view of the drive shown in FIGURE 21, looking in the direction of the arrow shown in FIGURE 21.

Figure 23:
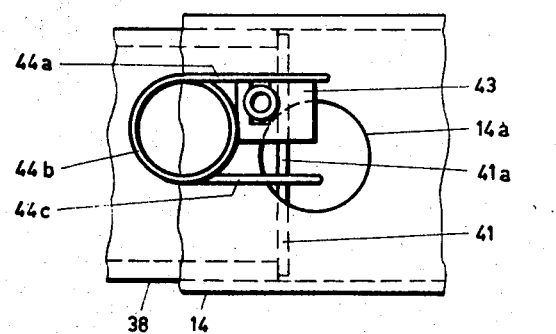

FIGURE 23 is a plan view of a part of a further embodiment of the invention.

With reference to FIGURE 1, the casing 1 of a reversible electric motor is formed with a flange to which the flange 3a of a cylindrical intermediate casing 3 is secured by bolts 2 coaxially with the motor shaft. The intermediate casing 3 has two axially aligning pins 4 extending radially from the motor shaft for supporting the intermediate casing in bearings that are not specially shown in the drawing. Tightly fastened to the intermediate casing 3 by screws 5 are the flange 6a of a sleeve 6 and a flange 7a of a tubular casing 7. Sleeve 6 contains an axially located ball bearing 8 for the head 9 of a lead screw. The lead screw head 9 is connected by a conventional flexible coupling 10 to the drive shaft 11 of the electric motor. A seal is inserted in sleeve 6 between the ball bearing 8 and coupling 10. This bears tightly against the spindle head 9. Firmly let into the spindle head 9 is the end 13a of a lead screw 13. In its interior the tubular casing 7 contains a tubular piston 14 which is guided by a piston ring 15 at each end. Each of the piston rings 15 is provided with a slot slideably engaged by a rail 16 secured inside casing 7 by screws 17. The presence of this rail 16 prevents the piston from rotating inside casing 7. The piston 14 contains two axially slideably movable ball bearings 18 and 19. Located between these ball bearings is a nut which works in the threads of the lead screw 13, and which at each end is formed with an extension of reduced diameter 20a and 20b respectively which fits into the inner ring of one of the ball bearings 18 and 19. A spring retaining ring 21 bears against the side of the outer ring of ball bearing 19 facing the electric motor and supports one end of a coiled compression spring 22 bearing at its other end against a spring retaining ring 23 held in position by an expanding split ring 24 inserted into that end of piston 14 which faces the motor. On the side of ball bearing 18 facing away from the motor a spring retaining ring 26 bears against the outer ring of the bearing and supports one end of a second coiled compression spring 26 which is held at the other end by a spring retaining ring 27 located by an expanding split ring 27'. The other side of the split ring carries a dish spring 28 which urges the flange 29a of a tubular piston rod 29 against an expanding split ring 14' inserted into the end of piston 14 remote from the motor. Screwed into the end of the lead screw 13 facing the driven member is a sliding block 13b which is slideable inside piston rod 29. The piston rod 29 itself passes through a bore in an end plate 30 inserted into the end of casing 7 remote from the motor, said end plate being held between two expanding split rings 31 clipped into grooves in this end of the casing 7. The end of piston rod 29 remote from the piston 14 is provided with a coupling member 29b for connection to the part that is to be driven. The inside and outside peripheral surfaces of the annular end plate 30 are each formed with a groove for insertion thereinto of a sealing ring 32 and 33 respectively. Sealing ring 32 forms a tight seal between end plate 30 and casing 7 and sealing ring 33 makes a similar seal between end plate 30 and piston rod 29.

Figure 12:
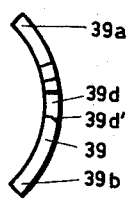

The central cylindrical part of nut 20 carries a coiled locking spring 34 of rectangular section (FIGS. 7 and 8) which near each end has a milled recess 34a and 34b respectively. This coil spring 34 held between two annular entraining rings 35a and 35b (FIGS. 9 and 10) which are loosely mounted on nut 20 and each located by a split expanding ring 36a and 36b respectively. The entraining rings 35a and 35b are each formed with an outward radial projection 35a' and 35b' respectively which engage the milled recesses 34a and 34b in the coil spring 34. Between the outer rings of the two ball bearings 18 and 19 a bush 38 is affixed to the inside of piston 14 by means of a screw 37. This bush 38 has a slot extending along its entire axial length. The edges of this longitudinal slot in bush 38 are broken, the major part of their lengths viz. 38a and 38a' being at least roughly parallel to the axis, whereas a short portion 38b and 38b' respectively forms an angle therewith, portion 38b being at one end of the bush and portion 38b' at the opposite end, and the two portions each increasing the width of the slot at the ends. This slot in bush 38 contains a plate-shaped small control element 39 (FIGS. 11 and 12). Some clearance is provided between this element and the inside surface of piston 14 and the peripheral surface of the coil spring 34. The element has a laterally projecting nose 39a and 39b respectively at each of two diagonally opposite corners and the lateral edge of each nose extending to the opposite end of the element 39 is concavely arcuate. A slot-shaped recess 39c and 39d respectively is cut axially into each end of this control element 39 and the projections 35a' and 35b' of the two entraining discs 35a and 35b loosely engage the two slots. The side of each slot 39c and 39d against which the projection 35a' and 35b' respectively bears, is bevelled at 39c' and 39d' respectively, and the faces of the projections 35a' and 35b' on entraining discs 35a and 35b which cooperate with these edges are correspondingly undercut, as shown at 25a'' and 35b'', in such manner that each projection 35a' and 35b' will embrace this edge of the slots 35c and 35d when in contact therewith and thereby prevent the control element 39 from being radially displaced.

When the described transmission is in normal operation the coupling assembly comprising nut 20, coil spring 34, entraining discs 35a and 35b, expanding split rings 36a and 36b and the control element 38 are in a central position in piston 14, the ball bearings 18 and 19 being held from both sides in contact with nut 20 and bush 38 by the two compression springs 26 and 22, the extensions 20a and 20b of nut 20 projecting to their full extent into the inner rings of the two ball bearings 18 and 19. The control element 39 is contained with slight clearance between the outer rings of ball bearings 18 and 19. When the screw spindle 13 begins to rotate nut 20 and all the parts mounted thereon are at first frictionally entrained and participate in this rotation until nose 39a of the control element 39 rides on to the sloping portion 38b of the slot edge in bush 38. The corresponding end of the coil spring 34 is thus retained, whereas the tendency of the nut 20 to continue rotating tightens the coil spring 34. The axial component of the reactive thrust of edge 38b on projection 39a of the control element 39 is transmitted by the control element 39 to the outer ring of ball bearing 18 and here likewise gives rise to a reactive thrust. The resultant couple causes the control element 39 in view of the available clearance to tilt about its point of contact with the outer ring of the ball bearing 18 in the clockwise direction. This angular displacement of the control element 39 affects the entraining disc 35b at the other end of the coil spring 34 in the direction of further tightening the coil spring and of further increasing its grip. Indeed the friction of the tightened coil spring is sufficient to prevent nut 20 from continuing to rotate with the lead screw 13. The nut therefore begins to travel on the rotating lead screw 13 and in the circumstances that have been assumed it will travel towards the end of casing 7 that is remote from the electric motor. Piston 14 and all the parts mounted thereon including piston rod 29 will participate in this motion. When the member that is to be moved reaches its limit position or if an obstruction limits its further displacement or if it is overloaded, the piston rod 29 and piston 14 cannot continue to travel as described. Since the driving motor, even if it were switched off at once, cannot come to a halt immediately but must have time to run out, the lead screw 13 will first continue to revolve. This means that, although piston 14 now remains stationary in casing 7, nut 20 will continue to travel inside piston 14, thrusting ball bearing 18 against the resistance of compression spring 26 away from bush 38 which is fast in piston 14. The nose 39a of the control element 39 therefore rides up ramp 38b in bush 38, and the control element 39 follows the moving outer ring of the ball bearing 18 in the axial direction without applying axial thrust to projection 35a′ of the entraining disc 35a. When eventually nose 39a of the control element reaches the external end of ramp 38b in bush 38 or approaches the same the corner of the control element 39 which is axially opposite nose 39a makes contact with edge 38a of bush 38 (FIG. 2). Reactive thrust by ramp 38b on nose 39a therefore now ceases and, instead, a fresh thrust is applied by edge 38a to the other corner of control element 39. The latter is now transmitted to projection 35b′ of entraining disc 35b. Entraining disc 35b is therefore retained, whereas the other entraining disc 35a is released. Consequently the friction engendered between nut 20 and the coil spring 34 will now result in the latter being unwound, reducing its tightness until frictional engagement between the locking spring 34 and the nut 20 ceases to be effective. Nut 20 therefore again starts to rotate together with lead screw 13 and ceases to travel axially along the same. The transmission is therefore in overrunning position and the electric motor can freely run down. If the electric motor is then restarted in the reverse hand of rotation, the lead screw 13 will first frictionally entrain nut 20 and all the parts mounted thereon. The nose 29b of control element 39 makes contact with the ramp 38b′ of bush 38, rides down this ramp and is carried towards the outer ring of ball bearing 19 until the control element 39 makes contact with the ring (FIG. 3). At the same time compression spring 26 urges ball bearing 18 against bush 38 and nut 20. The above cycle of operations will now repeat itself in the opposite direction, an additional tilting moment being applied to control element 39 which is due to the peripheral component of the reactive thrust of ramp 38b′ acting on nose 39b of the control element 39. This further assists in the tightening of the coil spring 34.

It is a matter of great importance that the control element 39 transmits no axial forces to the projections 35a′ and 35b′ of the entraining discs 35a and 35b which could be transmitted to the locking spring 34 and cause gradual wear of these elements, and that the coil spring 34 is not subjected to axial loads which might interfere with the proper functioning of the transmission.

It is not of the essence that the projections of the entraining discs 35a and 35b which engage the milled recesses 34a and 34b in the coil spring 34 and the outward radial projections should be combined and form single elements, as has been above assumed. The two projections may naturally be separate. Moreover, the end faces of the coil spring 34 may have more than one milled recess 34a and 34b respectively and the entraining discs 35a and 35b may be provided with a corresponding number of projections for engagement of these recesses.

The peripheral surface of the nut 20 which is embraced by the coil spring 34 may with advantage be hardened, or it may be provided with a hard chromium plating.

The size of the flank stress appearing in the thread of the lead screw 13 and in the thread of the nut 20 is determined in accordance with the size of the load to which the drive is subjected. If the lead screw 13 only has to transmit small loads, the torque is small and, in order that the nut 20 can turn in the coil spring 34, the control element 39 must release the spring 34 correspondingly. If however the lead screw is to carry a heavy load, the nut 20 is subjected to a large torque and the nut 20, can, in certain circumstances, turn in the spring 34 before the latter is completely released. There it has results with large loads a fair amount of friction on the spring 34 so that consequently there may be a certain amount of heat developed. For the normal transmission of the construction, that is to say when the latter only has to transmit small forces, or when the nut 20 only has to turn for a short time in the spring 34, this property is not disadvantageous and can in certain cases even be desirable. In other cases it can however be desired that when starting or running under a fairly large load, the lead screw 13 should operate with as little friction as possible and therefore without substantial heating. This can be achieved in the following manner:

The basic construction of the drive remains the same and reference is therefore to be had to the preceding part of the description. On both sides of the bush 38 there are between the latter and the ball-bearings 18 and 19 respectively ring shaped discs 40 (FIGURES 17 and 18). Each disc 40 has at its outer edge an angled lug 40a which is guided in a milled-in recess 38c of the bush 38. This lug 40a is so shaped that when the disc 40 abuts against the bush 38 it holds the disc in a given position in relation to the bush 38′, but when the disc is moved away from the bush 38 the disc can move in the substantially broader recess 38c and therefore allow a certain rotation of the disc 40 in relation to the bush 38. Diametrically opposite the part 40a, each disc 40 has a peripheral recess 40b in which the part 39e of the control element opposite the spur 39 or 39b can enter at a given position of the control element 39. This recess 40b is on the one side limited by an oblique face 40b′ and the part 39e of the control element 39 has a corresponding oblique part 39e′.

The drive constructed in this fashion and provided with the discs 40, as shown in FIGURES 13, 14 and 15 each showing a disc, functions in the following manner:

When as the lead screw 13 rotates, the piston 14 (see FIGURE 1) is displaced the control element takes up the position shown in FIGURE 13. The spur or control element 39 then lies on the oblique face 38b of the bush 38 and the abutting part 39e of the control element bears on the disc 40 which is held by the bearing 18.

The recess 40b in the disc 40 then lies at a certain distance from the part 39e of the control element 39. If continued movement of the tubular piston 14 be hindered for any reason, the lead screw 13 at first continues to and therefore causes a displacement of the nut 20 and of the bearing 18 in relation to the bush 38 as was the case with the transmission shown in FIGURES 1–12. Since the spur 39a of the control element 39 still remains in contact with the oblique face 38b of the bush 38 and the part 39e of the control element 39 rests against the disc 40 and therefore presses against the outer ring of the ball bearing 18, the disc 40 with the ball bearing 18 is moved in an axial direction away from the bush 38. Since the spur 39a of the control element 39 follows the oblique face 38b of the bush 38, the disc 40 cannot turn in relation to bush 38 in this direction on account of the engagement of the part 48a in the recess 38c of the bush 38, the part 39e of the control element 39 draws closer and closer to the recess 14b of the disc 40. This position is shown in FIGURE 14. Finally, as shown in FIGURE 15, the moment comes when the part 39e of the control element 39 can slide down into the recess 40b of the disc 40. Owing to the oblique face 39c' of the part 39e of the control element 39 and of the oblique face 40b' of the recess 40b of the disc 40, the disc 40 is immediately turned about its axis and as a result the whole recess 40b becomes from the part 39e of the control element 39. The control element 39 can now come to bear against the disc 40 and the pressure of the spur 39a of the control element 39 ceases completely since the meantime the end of the control element 39 lying axially opposite to the spur 39a has come into engagement with the sloping face 38a of the bush 38. As a result the spring 34 which is only held at one end turns and is relieved so that the nut 20 turns with a minimum torque and transmission ceases to transmit power.

On reversing the direction of rotation of the lead screw 13 the nut 20 turns and with it the spring 34 as well as the control element 39 until the other side of the latter comes into engagement with the sloping face of the bush 38. The part 39e of the control element 39 is then pushed along the oblique face 14b' of the recess out of the disc 40 and the spur 39b of the control elements 39 comes into engagement with the oblique face 38b of the bush 38. The part 39e of the control element 39 of the control element is then pressed against the disc 40 situated on the other side between the bush 38 and the ball bearing 19. The operation then can be repeated in the opposite direction, mutatis mutandis.

FIGURE 16 shows a section through a disc 40 with a view of the bush 38 from the side opposite to the side visible in FIGURE 13. It can be seen that the lug 40a of the disc 40 lies against an oblique face (extending in the axial direction) of the recess 38c of the bush 38, on pushing away the disc 40 from the bush 38 into its recess 38c a gap is formed and on pushing back the disc 40 towards the bush 38 owing to the presence of an oblique face 40a' the disc 40 is led back into the recess 38c.

The modification of the embodiment of the invention shown in FIGURES 19–22 and serving the same purpose as the embodiment shown in FIGURES 13 to 18 however is different from the latter embodiment in that in place of the discs 40 circular discs 41 are used which each have a radially projecting lug 41a and a recess 41b corresponding to the recess of the disc 40. The lug 41a of each of these discs 41 extends through an opening 14a provided in the piston 14 and can move in this opening. On the outside of the piston 14 there is provided for each of these discs 41 an abutment part 42 which is fixed so that it can be adjusted and which partly covers the opening 14a. This abutment part 42 has a notch or cut-out part bounded on one side by an edge 42a running in the axial direction and on the other side by an edge 42b at an inclination to the edge 42a. The end of the lug 41a, which fits into the cut-out notch, serves, together with the abutment part 42 and the cut-out part 42a, 42b, the same purpose as the lugs 40a of the discs 40 and the recesses 38c of the bush 38 in the embodiment of the drive shown in FIGURES 13–19 and the method of operation is exactly the same.

In the further embodiment of the drive according to the invention shown in FIGURE 23 the only difference from the embodiment shown in FIGURES 19–22 is that for each disc 41 on the outside of the piston 14 there is fixed instead of the abutment part 42 with the cutout part 42a, 42b, a small abutment part 43 which lacks such a cut-out part and is fixed so that it can be adjusted. Onto this abutment part 43 there is attached one limb 44a of a forked shaped spring which is attached to the outside of the piston 14 and forms a loop 44b. The other limb 44c of this spring presses the outwardly projecting part 41a of the disc 41 against the abutment part 43. Since the disc 41 is immediately released together with the part 41a when the pressure on the spur 39a of the control element 39 ceases, the spring 44a, 44b, 44c, presses the part 41a again against the abutment part 43 and thus brings the disc 41 back into its original position. The mode of operation of the drive otherwise corresponds exactly to the embodiment of the drive according to the invention shown in FIGURES 19–22.

I claim:

1. A transmission incorporating an overrunning device for converting the rotary motion of a drive means into an axial displacement of a driven member, wherein the drive is transmitted by a travelling nut on a lead screw driven by the drive means through the intermediary of a coiled tightenable locking spring to a non-rotatable axially movable tubular piston surrounding the nut and connected to the driven member, the ends of the coil spring being controlled by a longitudinally slotted bush that is fast in the tubular piston in such manner that for the transmission of force the coil spring tightly embraces the nut, preventing the same from participating in lead screw rotation, whereas in overrunning position the spring is unwound to release the nut permitting the same to participate in lead screw rotation, the nut being urged by two opposing compression springs into a middle position inside the tubular piston and being axially displaced inside the piston when axial movement of the latter is impeded, characterised in that the coiled locking spring which embraces the nut on the lead screw is held between two entraining rings loosely embracing the nut, said entraining rings being located between two expanding split rings clipped into an annular groove in the nut and each being formed with at least one projection for engagement of a recess in one axial end of the coil spring as well as with a radial outward projection for axially slidably guiding a control element which is provided with suitable guide means for the reception of said projections and which is contained in an axial slot in the longitudinally slotted non-rotatable bush which is fast in the piston connected with the driven member, and which surrounds the nut as well as the coil spring.

2. A transmission according to claim 1, characterised in that the control element has the shape of a cambered plate provided at diagonally opposite corners with a peripherally projecting nose connected by a concavely curved edge to the other corner on the same side, and that the longitudinal slot in the bush containing the control element is bounded by two broken oppositely symmetrical edges comprising a longer portion substantially parallel to the axis of the transmission and a shorter sloping portion forming a ramp for cooperation with a nose of the control element.

3. A transmission according to claim 2, characterised in that each entraining ring is formed with a single projection which engages the recess in the corresponding end of the coil spring, and which also projects radially outwards to engage the corresponding guideway in the control element.

4. A transmission as claimed in claim 3, characterised in that the projection on each entraining ring is undercut to embrace the cooperating bevelled edge of the corresponding guideway in the control element.

5. A transmission according to claim 1 characterised in that on both sides of the longitudinally slotted bush, and between the latter and ball bearings slidable in the tubular piston against whose outer race rings the springs holding the piston in its central position act, there are placed respectively two ring shaped discs which on their peripheries have on one side a recess limited by an oblique face, into which recess at a certain position of the disc in relation to the control element a part of the control element acting on this disc can fit so that the control element can, for the purpose of releasing the coiled locking spring, be pushed against this disc, the transmission being further characterised in that means are provided in order to hold the corresponding disc, when the latter bears on the longitudinally slotted bush, in a position in which its recess does not lie opposite the abutting part of the control element.

6. A transmission according to claim 5 characterised in that each disc has at its periphery an angled over lug which fits into a recess in the inner end of the bush and extends in the axial direction.

7. A transmission according to claim 5 characterised in that each disc has a part projecting radially outwards for which in the piston there is provided an opening in which it can move, and that on the outside of the piston for each such lug there is an adjustably fixed abutment part which fits into the above mentioned opening in the piston and on its part lying over this opening has a cut away part limited in one direction by an edge running in the axial direction and in the other direction by an edge inclined towards this edge, the lug being held in the cut-away portion.

8. A transmission according to claim 5 characterised in that each disc has an outwardly projecting radial lug able to move in an opening in the piston, and in that on the outside of the piston for each lug there is an abutment part arranged so that it can be adjusted, on which adjustment part one limb of a forked spring is attached while the other limb presses the lug against the abutment part.

References Cited

UNITED STATES PATENTS

| | | | |
|---|---|---|---|
| 3,029,659 | 4/1962 | Geyer | 74—424.8 |
| 3,053,104 | 9/1962 | Scavini | 74—424.8 |
| 3,157,058 | 11/1964 | Haller | 74—424.8 |
| 3,200,664 | 8/1965 | Mauric | 74—424.8 |
| 3,213,701 | 10/1965 | Earl | 74—424.8 |

DONLEY J. STOCKING, *Primary Examiner.*

L. H. GERIN, *Assistant Examiner.*